United States Patent
Ludwig et al.

(10) Patent No.: US 6,267,103 B1
(45) Date of Patent: *Jul. 31, 2001

(54) FUEL DELIVERY UNIT

(75) Inventors: Norbert Ludwig, Mainz; Klaus-Jurgen Lienig, Sulzbach, both of (DE)

(73) Assignee: Mannesmann VDO AG, Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/378,449

(22) Filed: Aug. 20, 1999

(30) Foreign Application Priority Data

Aug. 21, 1998 (DE) ................. 198 37 954

(51) Int. Cl.$^7$ .................................. F02M 37/04
(52) U.S. Cl. ........................... 123/509; 123/510
(58) Field of Search ............... 123/497, 509, 123/514, 456, 510; 137/572, 574, 576

(56) References Cited

U.S. PATENT DOCUMENTS

| | | |
|---|---|---|
| 3,014,623 | 12/1961 | Horn et al. . |
| 4,591,319 | 5/1986 | Takahashi et al. . |
| 5,002,467 | 3/1991 | Talaski et al. . |
| 5,040,954 * | 8/1991 | Iwai ..................... 123/509 |
| 5,613,476 * | 3/1997 | Oi ......................... 123/509 |
| 5,642,718 * | 7/1997 | Nakai .................... 123/509 |
| 5,642,719 * | 7/1997 | Brown ................... 123/509 |
| 5,647,328 * | 7/1997 | Fournier ................ 123/509 |
| 5,724,947 * | 3/1998 | Takaki et al. .......... 123/509 |
| 5,749,347 * | 5/1998 | Torii ...................... 123/509 |
| 5,758,627 * | 6/1998 | Minagawa ............. 123/509 |
| 5,778,926 * | 7/1998 | Tanaka .................. 123/509 |
| 6,125,825 * | 10/2000 | Sanchez et al. ....... 123/509 |
| 6,129,074 * | 10/2000 | Frank .................... 123/509 |

FOREIGN PATENT DOCUMENTS

| | | |
|---|---|---|
| 0379631 | 5/1989 | (EP) . |
| 1125684 | 5/1956 | (FR) . |

* cited by examiner

Primary Examiner—Carl S. Miller
(74) Attorney, Agent, or Firm—Mayer, Brown & Platt

(57) ABSTRACT

A fuel delivery unit for a motor vehicle is disclosed. The fuel delivery unit has a fuel pump (5) which is clamped in between a retaining part (1) and an elastically configured pump-retaining means (6) which is clipped on the retaining part (1). The retaining part (1) is open toward one side, so that the fuel pump (5) can be fitted once the delivery unit has been preassembled. It is thus possible to replace the fuel pump (5) in the case of a defect.

14 Claims, 3 Drawing Sheets

FUEL DELIVERY UNIT

FIELD OF INVENTION

The invention relates to a delivery unit for delivering fuel from a fuel tank to an internal combustion engine of a motor vehicle, having a fuel pump which can be inserted into the fuel tank and is fastened on a retaining part by a pump-retaining means.

BACKGROUND OF THE INVENTION

Fuel delivery units are frequently used in modern motor vehicles and are known in practice. In the case of the known delivery unit, a retaining part has a joint pot-like housing for a fuel filter and the delivery pump. The pump-retaining means is configured as a housing cover which is welded or adhesively bonded to the housing. This configuration has the advantage that the delivery unit is of very compact construction and can easily be put together to give a unit which can be preassembled.

The disadvantage with the known delivery unit, however, is that it is no longer possible for the fuel pump to be replaced once the delivery unit has been assembled. This means that the entire delivery unit is rendered unusable, for example, in the case of a defect in the fuel pump. Furthermore, the configuration does not allow the preassembled delivery unit to be combined subsequently with a fuel pump which is adapted to the envisaged application area. In particular in the case of a series production of delivery units for different motor vehicles with different fuel pumps, this results in very high storage costs.

Thus there is a need to configure a fuel delivery unit such that it is of particularly straightforward construction and that the fuel pump can be exchanged once the delivery unit has been assembled.

SUMMARY OF THE INVENTION

This problem is solved according to the invention in that the pump-retaining means is fastened releasably on the outside of the retaining part and is configured for bracing the fuel pump with the retaining part.

This configuration allows the fuel pump to be fitted in a final operation once the delivery unit has been assembled. The delivery unit and the fuel pump may thus be combined separately in accordance with the respective application area. In addition, it is possible for the fuel pump to be exchanged very easily in the case of a defect. By virtue of the fuel pump being braced with the pump-retaining means and the retaining part, there is no need for any fastening means which involve high outlay as far as fitting is concerned. The delivery unit is thus of particularly straightforward construction.

The assembly of the delivery unit according to the invention is particularly straightforward, and may additionally be automated, if the pump-retaining means is clipped to the retaining part.

According to another advantageous development of the invention, the connection of the fuel pump is particularly straightforward in design terms if an outlet stub of the fuel pump is prestressed against a connection of a fuel line, said connection being arranged on the retaining part.

According to another advantageous development of the invention, the fuel pump can be fitted in a particularly straightforward manner if it is arranged between the connection of the fuel line and the pump-retaining means. The fuel pump is consequently prestressed against the connection by the pump-retaining means, with the result that, at the same time as it is fitted, the fuel pump is connected to the fuel line leading away from it.

According to another advantageous development of the invention, the fuel pump is retained in a positively locking manner in the axial and radial directions once it has been fitted if the connection of the fuel line is configured such that it grips over the outlet stub. This results in the assembly of the delivery unit according to the invention being simplified further.

According to another advantageous development of the invention, the outlet stub is sealed with respect to the connection when the fuel pump is fitted if, in its region which borders the connection of the fuel line, the outlet stub has a sealing element. This means that there is no need for any hoses with hose clamps or the like to be fitted in order to connect the fuel pump. In addition, in the case of an elastic configuration of the sealing element, there is compensation for tolerances of the outlet stub and of the connection of the fuel line in the axial direction and/or radial direction. Furthermore, the sealing element damps the transmission of structure-borne sound of the fuel pump to the retaining part, with the result that the delivery unit according to the invention has a particularly low level of noise emission.

According to another advantageous development of the invention, electrical contact is made with the fuel pump as it is fitted if electric cables leading to the fuel pump have pairs of plug-in contacts which are aligned parallel to the direction in which the pump-retaining means is prestressed against the retaining part and are arranged on the fuel pump and the retaining part. This configuration results in a lot of time being saved when the fuel pump is fitted on the retaining part.

The delivery unit according to the invention is a particularly compact construction if, in a region which is directed toward the fuel pump, the retaining part has a filter housing for a fuel filter. In this case, in dependence on the configuration of the fuel tank, the filter housing may be arranged, for example, above the fuel pump.

According to another advantageous development of the invention, fuel-pump noise is damped by the fuel filter if the filter housing is configured such that it encloses the fuel pump. Furthermore, this configuration means that the filter housing, while requiring just a particularly small amount of installation space, has a large volume.

According to another advantageous development of the invention, the fuel pump is secured against rotation once it has been fitted if a radially projecting prefilter which is fastened on the fuel pump is connected in a positively locking manner to the pump-retaining means.

According to another advantageous development of the invention, the manner in which the fuel pump is prestressed against the retaining part is particularly straightforward in design terms if the pump-retaining means has a plurality of resilient elements distributed over the circumference. In addition, these resilient elements compensate for tolerances of the fuel pump and of the retaining part.

According to another advantageous development of the invention, the weight of the fuel pump need not be supported by the pump-retaining means if the pump-retaining means is arranged above the fuel pump.

If, according to another advantageous development of the invention, the pump-retaining means has guide elements for the fuel pump, this helps to secure the fuel pump particularly reliably.

If the pump-retaining means has an elastomer element, this helps to damp the structure-borne sound of the fuel pump further. Furthermore, the elastomer element serves, alone or in addition to the resilient elements, for prestressing the fuel pump against the retaining part.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE DRAWINGS

The invention permits numerous embodiments. In order to illustrate its basic principle further, two of these embodiments are described hereinbelow and are illustrated in the drawing, in which.

DETAILED DESCRIPTION OF THE PREFERRED EMBODIMENT

Figure 1:
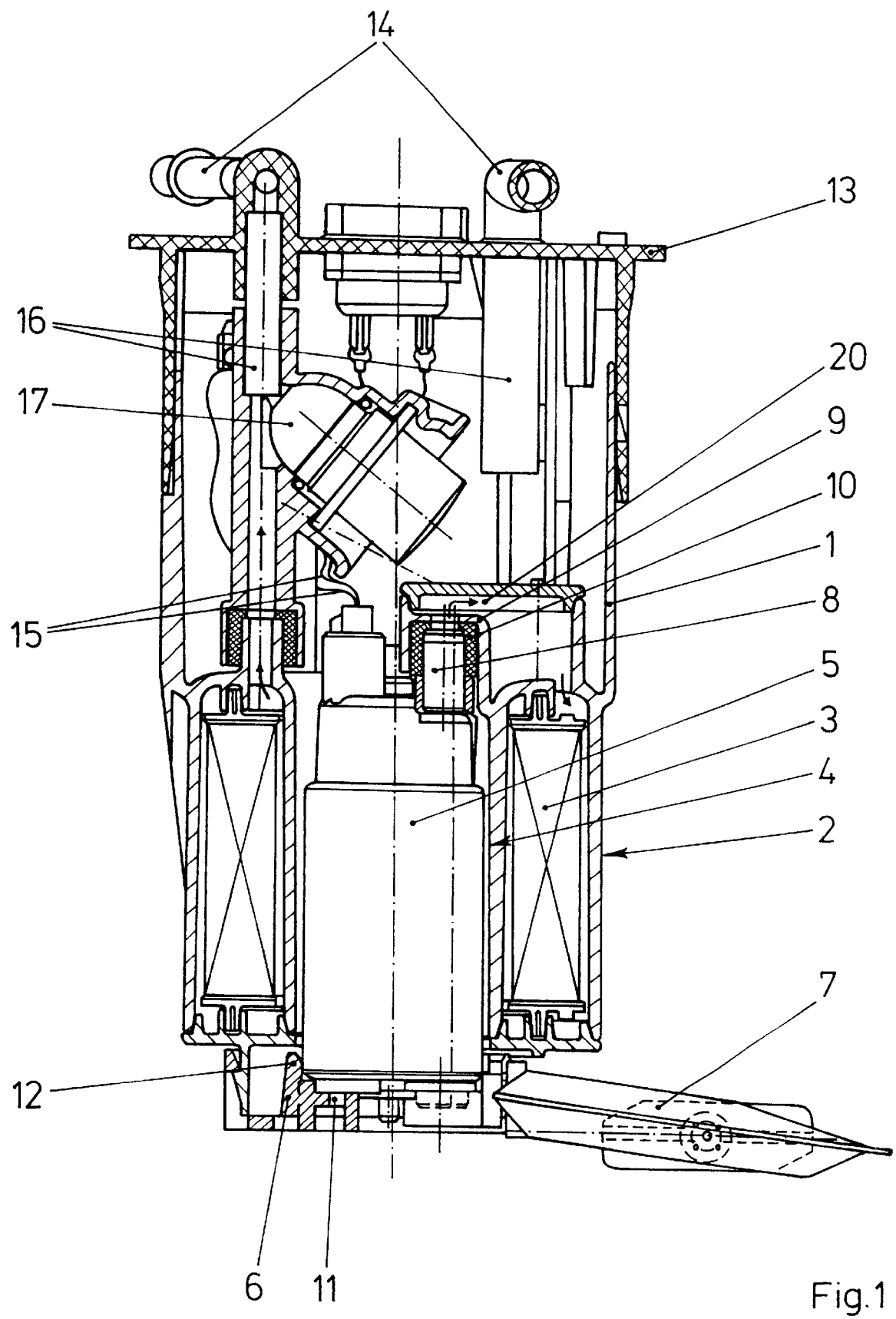
FIG. 1 shows a sectional illustration of a fuel delivery unit according to the invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Identical parts in the figures are provided with identical reference symbols. FIG. 1 shows a longitudinal section through a delivery unit according to the invention with a retaining part 1. In the bottom region, the retaining part 1 has a filter housing 2 with an annular filter element 3 which is provided for the throughflow of fuel from the outside to the inside. A cutout 4 for receiving a fuel pump 5 is located in the center of the filter housing 2. A pump-retaining means 6, which bears the fuel pump 5, is clipped on the underside of the retaining part 1. Once the connection clipping the pump-retaining means 6 on the retaining part 1 has been released, the fuel pump 5 can easily be removed from the cutout 4.

The fuel pump 5 bears a radially projecting prefilter 7. The fuel pump 5 has a connection 9 of a fuel line 20 leading to the filter housing 2 which grips outlet stub 8 on the top side of the fuel pump 5. A sealing element 10 made of an elastic material is arranged between the outlet stub 8 of the fuel pump 5 and the connection 9 of the filter housing 2. The pump-retaining means 6 has resilient elements 11 for prestressing the fuel pump 5, by way of its outlet stub 8, against the connection 9 of the filter housing 2. This braces the fuel pump 5 between the pump-retaining means 6 and the retaining part 1. Furthermore, the pump-retaining means 6 has guide elements 12 which butt against the fuel pump 5. The guide elements 12 are of elastic configuration and center the fuel pump 5 in the retaining part 1.

For fitting purposes, the retaining part 1 is introduced, by way of its bottom region, through an opening (not illustrated) of a fuel tank of a motor vehicle. A flange 13 arranged on the top side of the retaining part 1 subsequently closes off the opening. The flange 13 has connection stubs 14 for fuel lines 16 leading to an internal combustion engine (not illustrated either) of the motor vehicle. The fuel pump 5 is supplied with electric current via electric cables 15 leading through the flange 13. FIG. 1 also shows a pressure regulator 17 which is arranged in one of the fuel lines 16.

Figure 2:
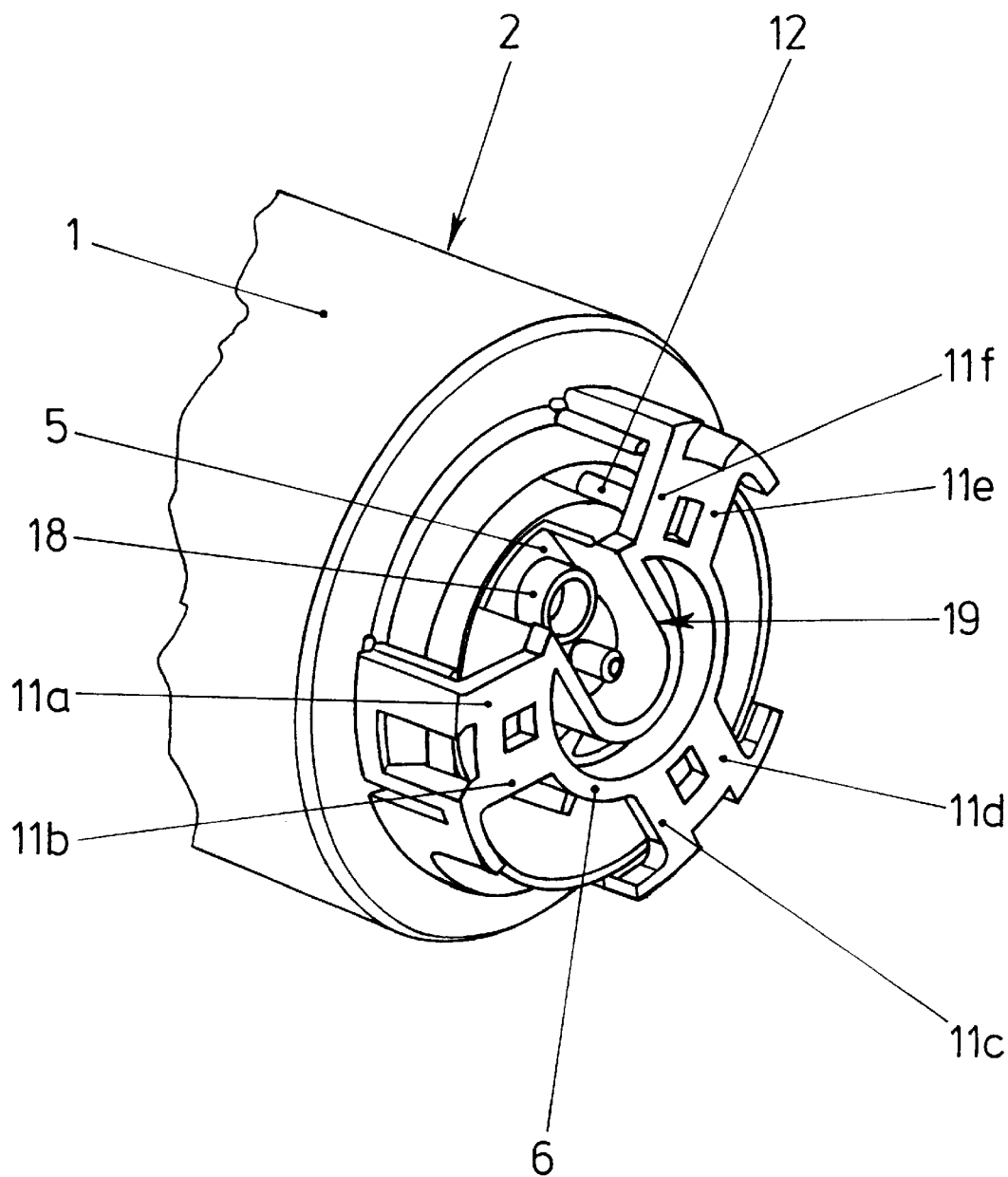
FIG. 2 shows a perspective illustration of a retaining part of the fuel delivery unit according to the invention from FIG. 1.

FIG. 2 shows an enlarged perspective illustration of the bottom region of the retaining part 1 with the pump-retaining means 6. In order to simplify the drawing, only a connection piece 18 of the prefilter 7 illustrated in FIG. 1 has been depicted here. It can be seen here that the pump-retaining means 6 has a total of six resilient elements 11a–11f distributed over its circumference. The pump-retaining means 6 has a U-shaped cutout 19 into which the connection piece 18 for the prefilter 7 from FIG. 1 projects. The connection piece 18 serves for preventing rotation of the fuel pump 5.

Figure 3:
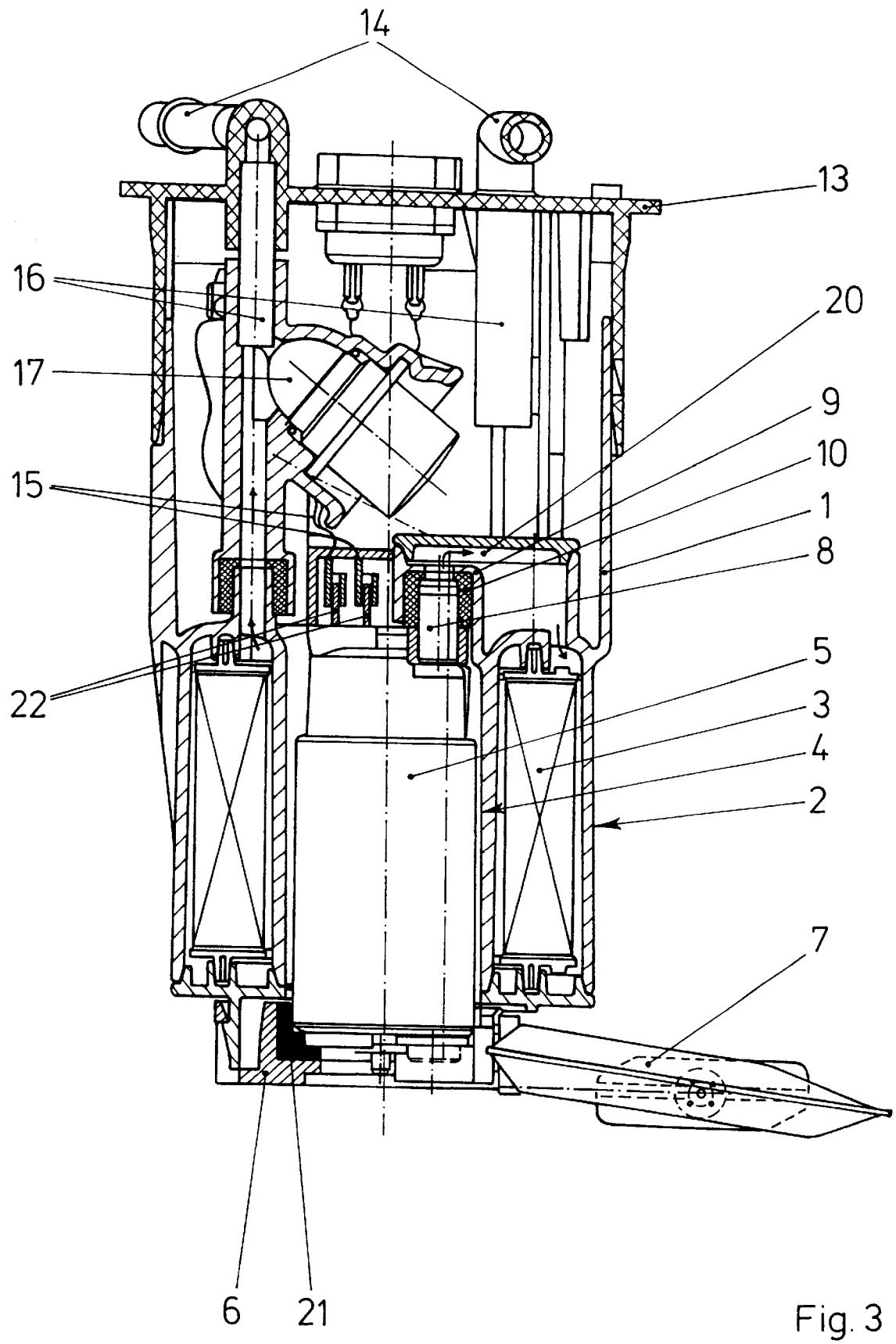
FIG. 3 shows a longitudinal section of a further embodiment of the fuel delivery unit according to the invention.

FIG. 3 shows a longitudinal section of a further embodiment of the delivery unit according to the invention. The delivery unit differs from that from FIG. 1 in that the pump-retaining means 6 has an elastomer element 21 butting against the fuel pump 5. Said elastomer element 21 prestresses the fuel pump 5 against the retaining part 1 as required and damps noise produced by the fuel pump 5. Furthermore, the fuel pump 5 is centered by the elastomer element 21.

The electric cables 15 leading to the fuel pump 5 have pairs of plug-in contacts 22 arranged on the top side of the fuel pump 5 and on the retaining part 1. These pairs of plug-in contacts 22 are aligned parallel to the direction in which the pump-retaining means 6 is prestressed. This means that electrical contact is made with the fuel pump 5 at the same time as it is fitted in the retaining part 1.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A delivery unit for delivering fuel from a fuel tank to an internal combustion engine of a motor vehicle, having a fuel pump with an inlet which can be inserted into the fuel tank and is fastened on a retaining part by a pump retaining, wherein the pump retainer (6) is removably fastened on the outside of the retaining part (1) and is configured for bracing the fuel pump (5) within the retaining part (1), the retaining part further including a cutout through which the inlet may be inserted to prevent the fuel pump from rotating within the retaining part.

2. The delivery unit as claimed in claim 1, wherein the pump retainer (6) is clipped to the retaining part (1).

3. The delivery unit as claimed in claim 1, wherein an outlet stub (8) of the fuel pump (5) is prestressed against a connection (9) of a fuel line (20), said connection being arranged on the retaining part (1).

4. The delivery unit as claimed in claim 1, wherein the fuel pump (5) is arranged between the connection (9) of the fuel line (20) and the pump retainer (6).

5. The delivery unit as claimed in claim 1, wherein the connection (9) of the fuel line (20) is configured such that it grips over the outlet stub (8).

6. The delivery unit as claimed in claim 1, wherein, in its region which butts against the connection (9) of the fuel line (20), the outlet stub (8) has a sealing element (10).

7. The delivery unit as claimed in claim 1, wherein electric cables (15) leading to the fuel pump (5) have pairs of plug-in contacts 22 which are aligned parallel to the direction in which the pump retainer (6) is prestressed against the retaining part (1) and are arranged on the fuel pump (5) and the retaining part (1).

8. The delivery unit as claimed in claim 1, wherein, in a region which is directed toward the fuel pump (5), the retaining part (1) has a filter housing (2) for a fuel filter (3).

9. The delivery unit as claimed in claim 1, wherein the filter housing (2) is configured such that it encloses the fuel pump (5).

10. The delivery unit as claimed in claim 1, wherein a radially projecting prefilter (7) which is fastened on the fuel pump (5) is connected in a positively locking manner to the pump retainer (6).

11. The delivery unit as claimed in claim 1, wherein the pump retainer (6) is circularly shaped has a plurality of resilient elements (11a–11f) distributed over the circumference.

12. The delivery unit as claimed in claim 1, wherein the pump retainer (6) is arranged above the fuel pump (5).

13. The delivery unit as claimed in claim 1, wherein the pump retainer (6) has guide elements (12) for the fuel pump (5).

14. The delivery unit as claimed in claim 1, wherein the pump retainer (6) has an elastomer element (21).

\* \* \* \* \*